Sept. 22, 1959     H. A. VANDER KAAY     2,905,191
VALVE
Filed July 15, 1957
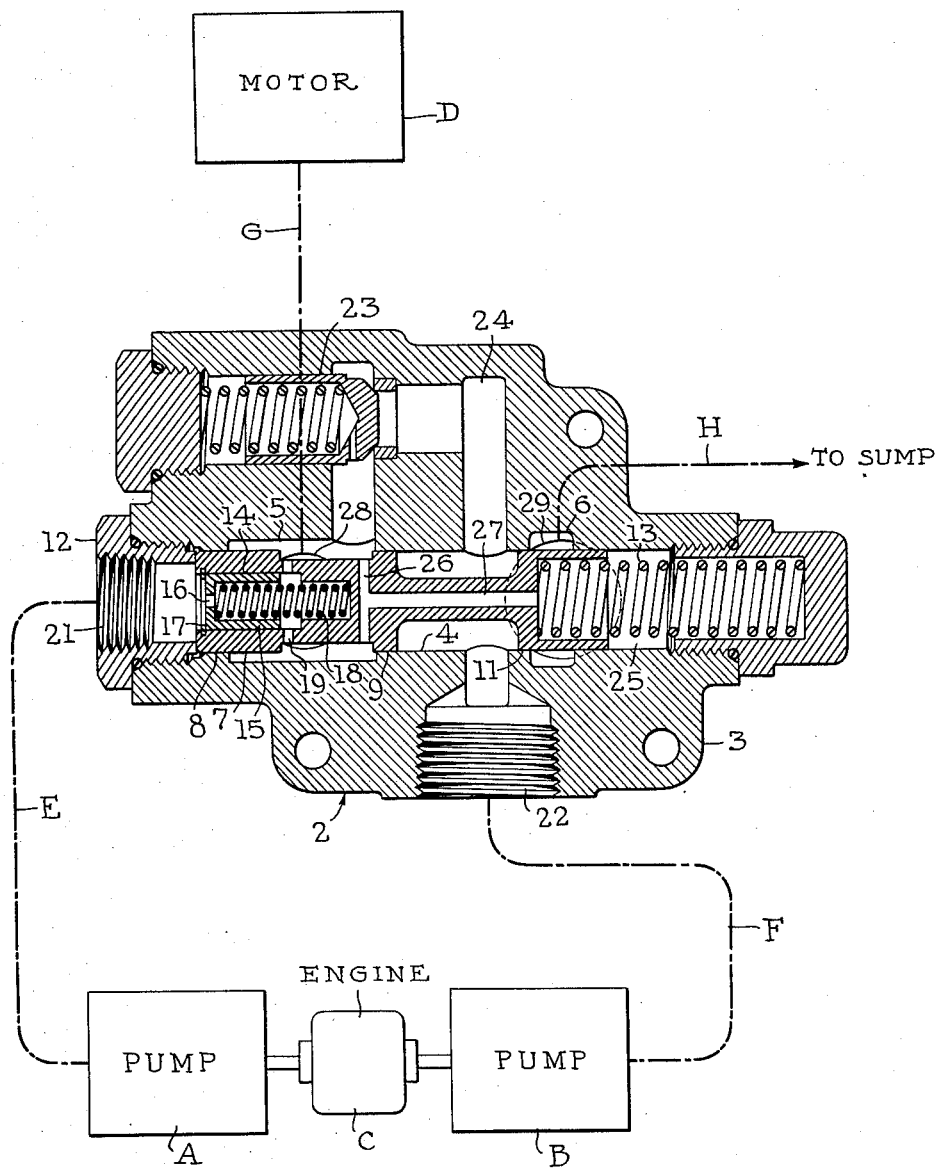
INVENTOR
Henry A. Vander Kaay
BY *Dodge and Sons*
ATTORNEYS United States Patent Office 2,905,191
Patented Sept. 22, 1959

2,905,191

VALVE

Henry Adrian Vander Kaay, Kalamazoo, Mich., assignor to The New York Air Brake Company, a corporation of New Jersey Application July 15, 1957, Serial No. 671,921

8 Claims. (Cl. 137—117)

This invention relates to fluid pressure distribution systems employing two pumps arranged in parallel flow relation, and more particularly to an improved valve for automatically unloading one of the pumps in response to the delivery rate of the other.

One typical system of the type mentioned may be used in motor vehicles for supplying motive pressure to a fluid motor operated air conditioning compressor. In these installations, the pumps are driven by the vehicle engine and when the engine speed is low the fluid delivered by both pumps is used to maintained a predetermined minimum compressor output. However, when the vehicle is cruising and the engine speed is high, the combinded output of both pumps is not required and therefore, it is desirable to unload one of them. Automatic unloading valves for accomplishing this result are known and generally include a fixed restrictor located in the discharge conduit of the main pump and a pressure responsive valve for selectively connecting the auxiliary pump with the delivery line or the sump in accordance with the pressure differential across the restrictor.

These valves have two major disadvantages. In the first place, all of the fluid delivered by the main pump must flow through the fixed restrictor, even after the auxiliary pump is unloaded. Since the pressure drop across the restrictor increases with flow rate and since this differential serves no useful function once the unloading valve has opened, it will be apparent that the fixed restrictor causes needless energy losses. Secondly, since the pressure differential across the fixed restrictor and its rate of change determine the position and speed of movement, respectively, of the unloading valve, it can be seen that gradual changes in the output of the main pump produce unnecessary throttling of the flow from the auxiliary pump. This effect also represents a needless waste of energy.

The object of this invention is to provide an unloading device for systems of the type mentioned in which the unloading valve moves rapidly between its two limiting positions and in which the rate of change of the pressure differential across the device, with respect to the delivery rate of the main pump, decreases after the auxiliary pump is unloaded. The invention consists, first, in providing mechanism for varying the restriction afforded by the restrictor in accordance with the rate of delivery of the main pump. In this way, the pressure differential across the restrictor will change rapidly as the rate of delivery of the main pump is varied, and as a result the unloading valve will move quickly between its loading and unloading positions. Throttling is thus materially reduced.

The second feature of the invention relates to means for reducing this rate of change of pressure differential after the auxiliary pump is unloaded. This feature comprises a passage connected in parallel flow relation with the restricted delivery path of the main pump, a by-pass valve normally closing this passage, and an actuator responsive to the pressure differential across the restrictor for opening the valve and directing a portion of the output of the main pump around the restrictor after the auxiliary pump is unloaded. When the parallel passage opens, the total restriction to flow afforded by both passages acting together is less than the restriction afforded by either one acting alone and consequently, further increases in the rate of delivery of the main pump will be accompanied by smaller increases in the pressure differential across the device.

The preferred embodiment of the invention will now be described in relation to the accompanying drawing, in which the unloading valve is shown in axial section in conjunction with diagrammatic representations of the system components with which it is used.

As shown in the drawing, the system comprises two pumps A and B connected in driven relation with an engine C and arranged to deliver pressure fluid to a suitable motor D via parallel supply lines E and F and common delivery line G. The unloading valve 2 is employed in the system for selectively connecting the supply line F with the delivery line G or the return line H in accordance with the rate of flow in supply line E.

The unloading valve 2 comprises a housing 3 having a central bore 4 connecting two spaced annular chambers 5 and 6. A slidable plunger valve 7, having spaced annular lands 8, 9 and 11, is located in the bore and biased into contact with plug 12 by a spring 13. The left end of the plunger 7 contains a bore 14 for receiving a slidable piston 15. The piston 15 contains a restricted orifice 16 and is biased into contact with a retaining ring 17 by spring 18. The bore 14 communicates with the annular chamber 5 via a plurality of radial passages 19. A first inlet port 21 is formed in the plug 12 and communicates with the left end of bore 4. The chamber 5 communicates with the second inlet port 22 via conventional check valve 23 and passage 24, and is also connected with spring chamber 25 via radial passages 26 and longitudinal passage 27 formed in the plunger 7.

In operation, the supply lines E and F would be connected, respectively, with first and second inlet ports 21 and 22, the delivery line G would be connected with chamber 5 via outlet port 28, and the return line H would be connected with chamber 6 via port 29. When the engine C is idling, the outputs of both pumps will be transmitted to the common delivery line G; pump A delivering via supply line E, port 21, orifice 16, radial passages 19, chamber 5, and port 28, and the pump B delivering via supply line F, port 22, passage 24, check valve 23, chamber 5, and port 28. As the speed of the engine C increases, so too does the rate of flow in supply lines E and F and the pressure differential across orifice 16. As this pressure differential increases, the piston 15 will move progressively to the right against the bias of spring 18, thereby restricting the radial passages 19 and increasing the pressure differential between inlet port 21 and chamber 5. Since the chamber 5 is connected with spring chamber 25 by passages 26 and 27, this pressure difference will be effective to move the plunger 7 to the right against the bias of spring 13. When the left edge of plunger land 11 uncovers the chamber 6, the pump B will be unloaded to the sump via port 29 and return line H. Further movement of the plunger 7 to the right will cause the left edge of land 8 to uncover the chamber 5, thereby establishing a second flow path between this chamber and inlet port 21.

It will be realized that the pressure differential across orifice 16 is a function of the flow rate in supply line E and therefore, since this differential causes piston 15 to restrict the radial passages 19, the total restriction afforded by this passage depends on the delivery rate of pump A. This feature is important because it furnishes a pressure differential between inlet port 21 and spring chamber 25 which changes rapidly with variations in the output rate of pump A. As a result, the plunger land 11 moves quickly between its loading and unloading positions and unnecessary throttling of the output of pump B is avoided.

It will also be realized that once pump B is unloaded, the need for the rapidly changing pressure differential ceases. The fact gives rise to the provision of the parallel flow path between port 21 and chamber 5 across the edge of land 8. As stated previously, the total restriction afforded by this path and the path comprising orifices 16 and 19 when acting in combination is less than the restriction afforded by the second-mentioned path when it is acting alone. Consequently after pump B is unloaded and land 8 uncovers chamber 5, further increases in the output of pump A will be accompanied by smaller increases in pressure loss between supply line E and delivery line G.

When the speed of engine C and the delivery rate of pump A decreases, the pressure differential between inlet port 21 and spring chamber 25 will also decrease and spring 13 will move the plunger 7 to the left, causing land 8 to interrupt the parallel path between port 21 and chamber 5. Once this path is closed, further decreases in the rate of delivery of pump A will be accompanied by rapid decreases in the pressure differential between inlet port 21 and spring chamber 25 because of the variable nature of the restriction afforded by passages 19. As a result of this rapid decrease in pressure differential, the plunger land 11 will move quickly to the left thereby loading pump B without needless throttling.

As stated previously, the drawing and description relate to a preferred embodiment of the invention, and since many changes in the structure of this embodiment can be made without departing from the inventive idea, the following claims should provide the sole measure of the scope of the invention.

What is claimed is:

1. An unloading valve comprising a housing having two inlet ports, an outlet port and a return port; first and second flow passages in parallel with each other and connecting one of the inlet ports with the outlet port; a third flow passage in parallel with the first and second passages and connecting the other inlet port with the outlet port; first and second flow restrictors located in the first flow passage; means for varying the restriction afforded by the second restrictor in accordance with the pressure differential across the first restrictor; an unloading valve controlling communication between the third flow passage and the return port; a check valve located in the third flow passage between the unloading valve and the outlet port; a by-pass valve controlling communication between said one inlet port and the outlet port through the second flow passage; spring means biasing the unloading valve and the by-pass valve to their closed positions; and means operable in response to the pressure differential across both restrictors for sequentially opening the unloading valve and the by-pass valve, the mechanism being so arranged that the unloading valve is the first to open.

2. An unloading valve comprising a housing having two inlet ports, an outlet port and a return port; first and second flow passages in parallel with each other and connecting one of the inlet ports with the outlet port; a third flow passage in parallel with the first and second passages and connecting the other inlet port with the outlet port; first and second flow restrictors located in the first flow passage; means for varying the restriction afforded by the second restrictor in accordance with the pressure differential across the first restrictor; an unloading valve controlling communication between the third flow passage and the return port and biased to a position in which this communication is interrupted; means operable in response to the pressure differential across both restrictors for opening the unloading valve; a check valve located in the third flow passage between the unloading valve and the outlet port; a by-pass valve controlling flow through the second flow passage and biased to a flow interrupting position; and means operable in response to the pressure differential across both restrictors for opening the by-pass valve after the unloading valve has opened.

3. An unloading valve comprising a housing having two inlet ports, an outlet port and a return port; first and second flow passages in parallel with each other and connecting one of the inlet ports with the outlet port; a third flow passage in parallel with the first and second passages and connecting the other inlet port with the outlet port; a flow restrictor in the first flow passage; means for varying the restriction afforded by the restrictor in accordance with the rate of flow in the first flow passage; an unloading valve controlling communication between the third flow passage and the return port; means biasing the unloading valve to its closed position; means operable in response to the pressure differential across the restrictor for opening the unloading valve against the biasing means; a check valve located in the third flow passage between the unloading valve and the outlet port; a by-pass valve controlling flow through the second flow passage; and means operable upon an increase in the pressure differential across the restrictor for opening the by-pass valve after the unloading valve has opened, and operable upon a decrease in this pressure differential for closing the by-pass valve before the unloading valve has closed.

4. A fluid pressure distribution system comprising first and second pressure sources; a common delivery line and a return line; first and second parallel flow paths connecting the first pressure source with the common delivery line; a third flow path in parallel with the first and second paths and connecting the second pressure source with the common delivery line; a flow restrictor in the first flow path; means for varying the restriction afforded by the restrictor in response to variations in the rate of flow in the first flow path; an unloading valve controlling communication between the third flow path and the return line and biased to a position in which this communication is interrupted; means operable in response to the pressure differential across the restrictor for opening the unloading valve; a check valve located in the third flow path between the unloading valve and the common delivery line; a by-pass valve controlling flow in the second flow path and biased to a flow interrupting position; and means operable in response to the pressure differential across the restrictor for opening the by-pass valve.

5. An unloading valve comprising a housing having two inlet ports, an outlet port and a return port; first and second flow passages in parallel with each other and connecting one of the inlet ports with the outlet port; a third flow passage in parallel with the first and second passages and connecting the other inlet port with the outlet port; a flow restrictor in the first flow passage; an unloading valve controlling communication between the third flow passage and the return port; a check valve located in the third flow passage between the unloading valve and the outlet port; a by-pass valve controlling flow through the second flow passage; and means operable upon an increase in the pressure differential across the restrictor for opening the unloading valve and then opening the by-pass valve, and operable upon a decrease in this pressure differential for closing the by-pass valve and then closing the unloading valve.

6. An unloading valve comprising a housing having two inlet ports, an outlet port and a return port; first and second flow passages in parallel with each other and connecting one of the inlet ports with the outlet port; a third flow passage in parallel with the first and second passages and connecting the other inlet port with the outlet port; a flow restrictor in the first flow passage; an unloading valve controlling communication between the third flow passage and the return port and biased to a position in which this communication is interrupted; means operable in response to the pressure differential across the restrictor for opening the unloading valve; a check valve located in the third flow passage between the unloading valve and the outlet port; a by-pass valve controlling flow through the second passage and biased to a flow interrupting position; and means operable in response to the pressure differential across the restrictor for opening the by-pass valve after the unloading valve has opened.

7. A fluid pressure distribution system comprising first and second pressure sources; a common delivery line and a return line; first and second parallel flow paths connecting the first pressure source with the common delivery line; a third flow path in parallel with the first and second paths and connecting the second pressure source with the common delivery line; first and second restrictors located in the first flow path; means for varying the restriction afforded by the second restrictor in accordance with the pressure differential across the first restrictor; an unloading valve controlling communication between the third flow path and the return line and biased to a position in which this communication is interrupted; means operable in response to the pressure differential across the two restrictors for opening the unloading valve; a check valve in the third flow path between the unloading valve and the common delivery line; a by-pass valve controlling flow in the second flow path and biased to a flow-interrupting position; and means operable in response to the pressure differential across the two restrictors for opening the by-pass valve.

8. A fluid pressure distribution system comprising first and second pressure sources; a common delivery line and a return line; first and second parallel flow paths connecting the first pressure source with the common delivery line; a third flow path in parallel with the first and second path and connecting the second pressure source with the common delivery line; a flow restrictor in the first flow path; an unloading valve controlling communication between the third flow path and the return line and biased to a position in which this communication is interrupted; means operable in response to the pressure differential across the restrictor for opening the unloading valve; a check valve located in the third flow path between the unloading valve and the common delivery line; a by-pass valve controlling flow through the second flow path and biased to a flow-interrupting position; and means operable in response to the pressure differential across the restrictor for opening the by-pass valve after the unloading valve has opened.

References Cited in the file of this patent
UNITED STATES PATENTS

| | | |
|---|---|---|
| 2,737,196 | Eames | Mar. 6, 1956 |
| 2,761,388 | Peterson | Sept. 4, 1956 |
| 2,817,352 | Barten et al. | Dec. 24, 1957 |